United States Patent
Elsherif et al.

(10) Patent No.: US 9,713,056 B2
(45) Date of Patent: Jul. 18, 2017

(54) SWITCHING AND AGGREGATION OF SMALL CELL WIRELESS TRAFFIC

(75) Inventors: Ahmed Ragab Elsherif, Santa Clara, CA (US); Wei-Peng Chen, Fremont, CA (US)

(73) Assignee: Fujitsu Limited, Kawasaki (JP)

(*) Notice: Subject to any disclaimer, the term of this patent is extended or adjusted under 35 U.S.C. 154(b) by 98 days.

(21) Appl. No.: 13/620,834

(22) Filed: Sep. 15, 2012

(65) Prior Publication Data

US 2014/0080483 A1   Mar. 20, 2014

(51) Int. Cl.
*H04W 36/00* (2009.01)
*H04W 36/22* (2009.01)
*H04W 16/16* (2009.01)
*H04W 36/14* (2009.01)
*H04W 92/02* (2009.01)

(52) U.S. Cl.
CPC .......... *H04W 36/22* (2013.01); *H04W 16/16* (2013.01); *H04W 36/14* (2013.01); *H04W 92/02* (2013.01)

(58) Field of Classification Search
CPC ....... H04W 36/30; H04W 4/16; H04W 16/14; H04W 72/04
USPC .... 455/414.1, 436, 438–439, 445, 448, 450, 455/452.1–452.2, 453
See application file for complete search history.

(56) References Cited

U.S. PATENT DOCUMENTS

| | | | | |
|---|---|---|---|---|
| 6,021,309 | A * | 2/2000 | Sherman et al. | 455/12.1 |
| 2011/0019639 | A1* | 1/2011 | Karaoguz et al. | 370/331 |
| 2013/0010756 | A1* | 1/2013 | Liang et al. | 370/331 |
| 2013/0028199 | A1* | 1/2013 | Song | H04W 16/12 370/329 |
| 2013/0084873 | A1* | 4/2013 | Sharony | H04W 36/14 455/438 |
| 2013/0242965 | A1* | 9/2013 | Horn | H04W 24/10 370/338 |
| 2014/0153489 | A1* | 6/2014 | Perras | H04W 60/00 370/328 |

OTHER PUBLICATIONS

C. Sankaran, "Data Offloading Techniques in 3GPP Rel-10 Networks: A Tutorial", IEEE Communication Magazine, vol. 50, Issue 6, pp. 46-53, Jun. 2012.
Hietalahti, "3GPP Core Network migration path for HSPA+ and LTE", 3GPP, 30 pages, May 2010.
T. Nakamura, "Further LTE Enhancements toward Future Radio Access", NTT Docomo, Inc., 25 pages, 2012.

(Continued)

*Primary Examiner* — Anthony Addy
*Assistant Examiner* — Matthew Genack
(74) *Attorney, Agent, or Firm* — Baker Botts L.L.P.

(57) ABSTRACT

A small cell controller for switching and aggregating wireless data between a cellular network and a noncellular network is disclosed. The small cell controller may include a cellular interface to communicate data with the cellular network, a noncellular interface to communicate data with the noncellular network, and an analyzer configured to determine whether a portion of the wireless data may be transferred from the cellular network to the noncellular network, and determine a first portion of the noncellular network to be allocated to the portion of the wireless data when the portion of the wireless data may be transferred.

17 Claims, 6 Drawing Sheets

(56) References Cited

OTHER PUBLICATIONS

IEEE Standard for Wireless LAN Medium Access Control (MAC) and Physical Layer (PHY) Specifications, P802.11, 2793, Mar. 29, 2012.
G. Bianchi, "Performance Analysis of the IEEE 802.11 Distributed Coordination Function", IEEE Journal on Selected Areas in Communications, vol. 18, No. 3, 13 pages, Mar. 2000.
D. Malone et al., "Modeling the 802.11 Distributed Coordination Function in Nonsaturated Heterogeneous Conditions", IEEE/ACM Transactions on Networking, vol. 15, No. 1, 14 pages, Feb. 2007.
F. Fitzek et al., "Robust Header Compression (ROHC) Performance for Multimedia Transmission over 3G/4G Wireless Networks", Wireless Personal Communication, 32:23-41, 2005.
3GPP, ETSI TS 123 261 v10.2.0 Technical Specification, "Universal Mobile Telecommunications System (UMTS); LTE; IP flow mobility and seamless Wireless Local Area Network (WLAN offload; Stage 2", 24 pages, Mar. 2012.
3GPP, ETSI TS 136 331 v11.1.0 Technical Specification, "LTE; Evolved Universal Terrestrial Radio Access (E-UTRA); Radio Resource Control (RRC); Protocol specification", 329 pages, Nov. 2012.

\* cited by examiner

SWITCHING AND AGGREGATION OF SMALL CELL WIRELESS TRAFFIC

TECHNICAL FIELD

The present disclosure relates generally to methods and systems for switching and aggregating small cell wireless traffic.

BACKGROUND

Various wireless technologies (e.g., 3G, 4G, 3GPP Long Term Evolution (LTE), LTE-Advanced (LTE-A), WiMAX, etc.) allow for the use of small, user installed, base stations, generally referred to herein as small cells (e.g., femtocells in WiMAX or Home node-B in 3GPP). The small cell is provided to the user by a wireless service provider. The user or a wireless service provider's technician installs the small cell in the user's home or office, generally referred to herein as a home or home location, to increase the signal quality and strength of the local wireless coverage. The small cell's backhaul connection to the wireless service provider's network is provided via the user's home network access (e.g., DSL). The small cell operates in a similar wireless fashion (e.g., uses the same licensed frequency band) to the wireless service provider's other base stations (e.g., macro base stations (MBSs) and/or relay stations). The small cell may allow for the handover from the MBS to the small cell to be done without the user noticing (e.g., similar to the handover from one MBS to another).

An additional advantage of small cells is that they may be able to assist in handling excess data traffic apart from the wireless service provider's base stations, thus lessening the load on the base station and improving performance for the user. However, as the number and importance of small cells increase, the density of small cells within a geographic area also increases. Thus, it has become increasingly important to account for this increased density when determining small cell performance.

SUMMARY

A small cell controller for switching and aggregating wireless data between a cellular network and a noncellular network is disclosed. The small cell controller may include a cellular interface to communicate data with the cellular network, a noncellular interface to communicate data with the noncellular network, and an analyzer configured to determine whether a portion of the wireless data may be transferred from the cellular network to the noncellular network, and determine a first portion of the noncellular network to be allocated to the portion of the wireless data when the portion of the wireless data may be transferred.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
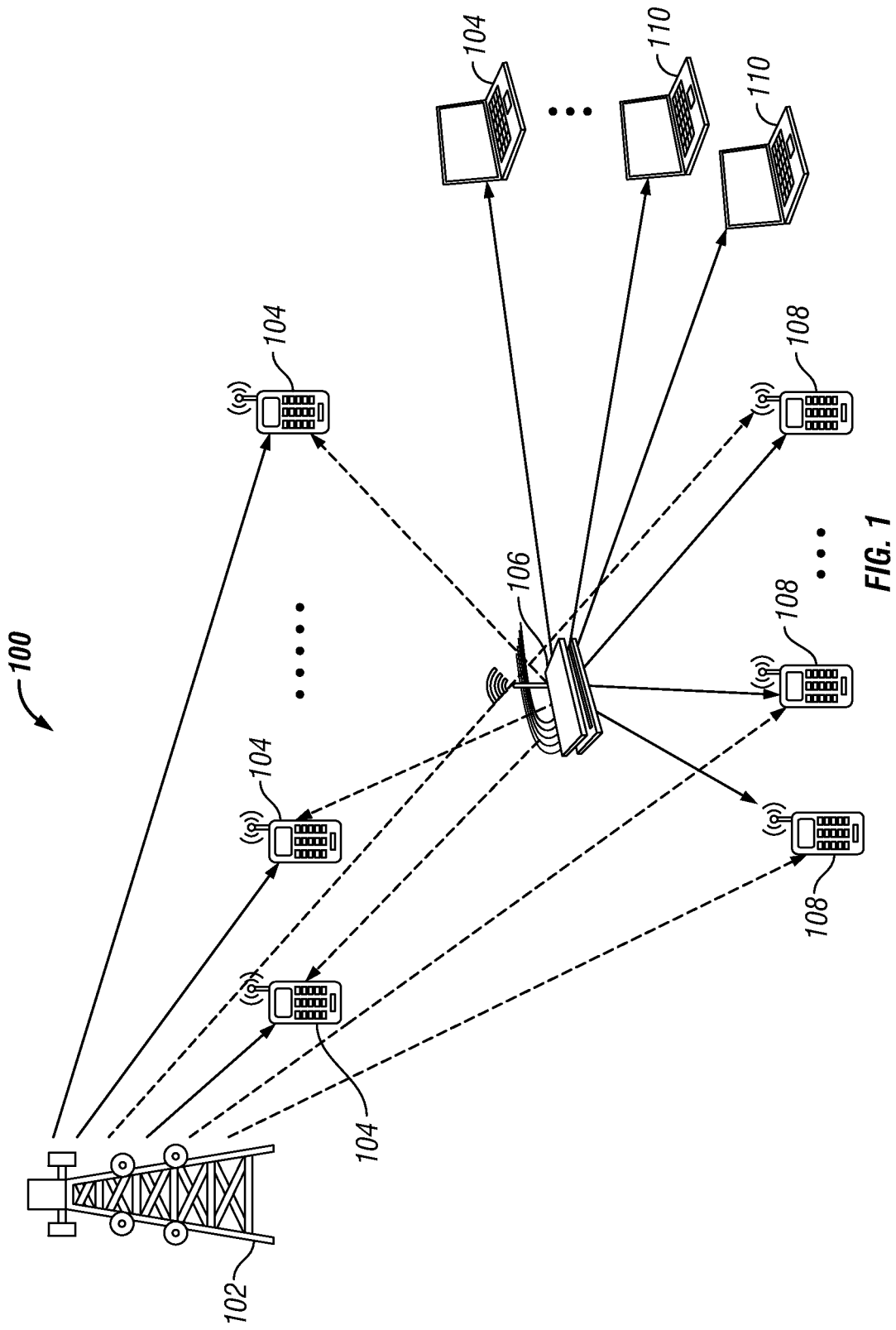
FIG. 1 illustrates an example system for switching and aggregating wireless signals, in accordance with certain embodiments of the present disclosure.

FIG. 1 illustrates an example system 100 for switching and aggregating wireless signals, in accordance with certain embodiments of the present disclosure. In some embodiments, system 100 may include one or more macro base station(s) ("MBS") 102, one or more macro user equipment(s) ("MUE") 104, one or more small cell evolved node B(s) ("SeNB") 106, one or more small cell user equipment(s) ("SUE") 108, and one or more small cell node(s) ("SN") 110.

In some embodiments, MBS 102 may be a cellular transmission tower such as those operated by cellular service providers. For example, MBS 102 may be a cellular transmission tower configured to transmit cellular data that complies with the 3d Generation Partnership Project ("3GPP") protocol(s). In the example illustrated in FIG. 1, MBS 102 may be configured to transmit cellular data that complies with the Long Term Evolution ("LTE") standard based on Release 8 of 3GPP. In the same or alternative embodiments, MBS 102 may be configured to transmit cellular data that complies with other cellular protocols, including later releases of 3GPP or other fourth- (or later) generation protocols such as LTE-A.

In some embodiments, MBS 102 may be configured to transmit cellular data to one or more MUE(s) 104. MUE 104 may be any electronic device configured to receive and/or transmit cellular data from MBS 102. For example, MUE 104 may be a cellular telephone, cellular modem, or other device configured to communicate with MBS 102.

System 100 may also include one or more small cell controller(s), e.g., Small eNode B ("SeNB")(s) 106. In some embodiments, SeNB 106 may be any electronic device configured to switch and/or aggregate cellular and wireless data for communication among other device, as described in more detail below with reference to FIGS. 2-6. For example, SeNB 106 may be an electronic device configured to provide load balancing between the cellular communication path provided by MBS 102 and a private WiFi communication path. In some embodiments, SeNB 106 may include memory and one or more processor(s) configured to execute instructions stored on that memory. As described in more detail below with reference to FIGS. 2-6, SeNB 106 may be configured to execute instructions performing the optimization routines discussed below. In other configurations, responsibilities for various portions may be distributed among the components of system 100. For example, in legacy configurations of a small cell controller, it may be necessary to include a node separate from a radio network controller.

In some embodiments, it may be necessary or desirable for a home or business to have one or more small cells deployed throughout the home or business. These small cells may be electronic devices configured to route data to a cellular provider's core network over a broadband or other communication link. In such a manner, a cellular provider may extend coverage of the cellular network indoors or to areas which might be more difficult to reach via conventional cellular radiation techniques. In some embodiments, the small cell may communicate with the cellular provider's core network over a wireline link such as DSL, optical fiber, or other appropriate wireline link, or a wireless link such as a wireless local area network ("WiFi"). Electronic devices within the home or business may then be able to connect to the WiFi network (and subsequently the cellular provider's core network) via one or more non-cellular connection(s). In some embodiments, this may be beneficial to both the user and the wireless service provider. When small cells are active, the user, the user equipment, the radio access network, or some combination thereof may be able to offload some portion of the cellular data traffic onto the local area network for communication back to the core network. This may have the benefit of lowering the traffic level on the wireless base stations as well as improving performance for the user.

In some existing configurations of small cells, this "data offload" process may be performed by a number of different approaches. For example, Local IP Access ("LIPA") uses a femtocell to enable a user to offload all traffic onto the local area network. Selected IP Traffic Offload ("SIPTO") is another data offload approach. Under this approach, internet traffic can flow from the femtocell directly to the internet, thereby bypassing the wireless service provider's core network. Yet another approach is IP Flow Mobility and Seamless Offload ("IFOM"). This approach leverages the user equipment to determine which communication method to use. However, this method relies on user action in order to offload traffic.

The approach described in more detail below with reference to FIGS. 1-6 illustrates a data offloading and optimization approach that is transparent to the user, takes advantage of both cellular and noncellular communication paths, and, in some embodiments, consolidates processing into the small cell controller.

Referring again to FIG. 1, in some embodiments, at least two types of electronic devices may be configured to connect to SeNB 106. SUE 108 may be an electronic device configured to communicate over either or both of a cellular and a WiFi communication path. For example, a cellular telephone, tablet computer, laptop computer, or other appropriate electronic device may be configured to transmit and/or receive data over a cellular and/or WiFi communication path. In the same or alternative embodiments, system 100 may also include one or more SN(s) 110. SN 110 may be an electronic device configured to communicate only over a WiFi communication path. For example, SN 110 may be a laptop computer or other device configured to communicate only over a WiFi communication path.

In operation, there may be a number of users attempting to access a cellular provider's core network within a given area. As described in more detail above, the implementation of small cells may be one method to alleviate traffic congestion. In an area with a number of such small cells, it may be necessary or desirable to manage the interference between the small cells and MBS 102 (as well as manage the interference among small cells) in order to optimize data traffic. As described in more detail below with reference to FIGS. 2-6, SeNB 106 may be configured to optimize the balancing of data between the cellular communication path(s) among MUE 104 and MBS 102; the cellular communication path(s) among SUE 108 and SeNB 106; the wireless communication path(s) among SUE 108 and the local area network; and the wireless communication path(s) among SN 110 and the local area network. In some embodiments, SeNB 106 may perform this optimization through a mixture of admission control, resource allocation, and/or packet scheduling.

Although FIG. 1 illustrates example system 100 as having one MBS 102, three MUE 102, 1 SeNB 106, three SUE 108, and three SN 110, it should be understood that these example are provided to aid in understanding and any number of any given component may be present in a given configuration without departing from the scope of the present disclosure. It should also be understood that the number of any given component may change over time. For example, the number and identity of SUE 108 present within range of a given SeNB 106 may change over time as users move into and out of the space designed to be serviced by SeNB 106.

Further, although FIG. 1 illustrates only one iteration of the system comprising MUE 104, SeNB 106, SUE 108, SN 110, a number of such iterations may be present within system 100 without departing from the scope of the present disclosure. For example, there may be a plurality of SeNB 106 present within range of a given MBS 102. In other embodiments, system 100 may not include MBS 102. In those or alternative embodiments, there may instead be a cascade (or other dependent configuration) of a plurality of SeNB 106. For example, a business may wish to outfit a large building with multiple small cells. In such a configuration, it may be necessary or desirable to communicatively couple one SeNB 106 to another in order to further communicatively couple SeNB 106 to a remotely located MBS 102 or other data provider.

Still further, although FIG. 1 illustrates example system 100 as employing cellular communication between MBS 102 and user equipment, and wireless communication between SeNB 106 and user equipment, other communication protocols may be implemented in any given configuration without departing from the scope of the present disclosure. For example, SeNB 106 may connect user equipment to the cellular provider's core network via ethernet or other hard-wired communication mechanisms, as well as any appropriate communication protocol, standard, and/or implementation. In the more detailed description below with reference to FIGS. 1-6, the communication path(s) between MBS 102 (or other appropriate communication device) and user equipment may be generically referred to as communication within the "licensed band" or "cellular network." The communication path(s) between SeNB 106 and SUEs 108 over the licensed band may be generically referred to as communication within the "licensed band" or "cellular network." The communication path(s) between SeNB 106 and SUEs 108 or SNs 110 over a license-exempt band may be generically referred to as communication within the "unlicensed band."

Although reference is made above and below with reference to FIGS. 2-6 to LTE as the licensed band technology and WiFi as the unlicensed band technology, other technologies, standards, and/or protocols may be implemented without departing from the scope of the present disclosure. For example, the systems and methods described herein may also be applied to WiMAX as another licensed cellular technology with OFDM transmission. As a further example, one of ordinary skill in the art would recognize that the switching and aggregation of data between licensed band technologies and WiFi disclosed herein may be applied to TV white spaces (IEEE802.22) as the unlicensed band technology.

Figure 2:
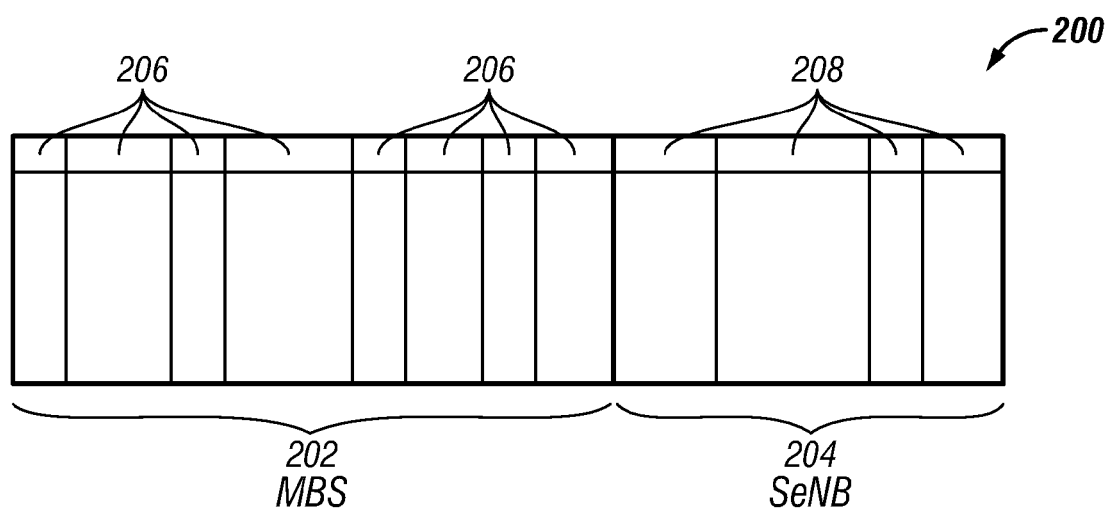
FIG. 2 illustrates an example allocation of bandwidth between the licensed and unlicensed bands for a given SUE, in accordance with certain embodiments of the present disclosure.

FIG. 2 illustrates an example allocation 200 of a plurality of resource blocks of bandwidth used for licensed bands shared by both MBS 102 and SeNB 106 normalized over one subframe in time, in accordance with certain embodiments of the present disclosure. Example allocation 200 may be understood to represent multiple resource blocks in frequency along a frequency axis. Allocation 200 may then be understood to represent a snapshot of frequency allocation versus frequency. The frequency blocks may then be shared between MBS 102 and SeNB 106 as described in more detail below.

In the example allocation 200, licensed bandwidth is allocated between (1) a communication path between MUE 104 and MBS 102, and (2) a communication path between SUE 108 and SeNB 106. These are represented by bandwidth allocation regions 202, 204, respectively. For example, as described in more detail below and with reference to FIGS. 3-6, allocation region 202 may include a plurality of sub-regions 206, with each sub-region 206 corresponding to a data communication request (e.g., a request for a particular service) between MUEs 104 and MBS 102. Likewise, allocation region 204 may include a plurality of sub-regions 208, with each sub-region 208 corresponding to a data communication request (e.g., a request for a particular service) between SUEs 108 and SeNB 106.

In some embodiments, there may be interference between the communication handled by MBS 102 and SeNB 106. One approach to managing this interference may be to define a preset allocation between allocation regions 202, 204. However, such an approach may be unable to take advantage of unused bandwidth. For instance, if the allocation between allocation regions 202, 204 were fixed, the data communication requests for a given allocation region 202, 204 may not require the entirety of the allocation. In such a case, bandwidth may be wasted. As described in more detail below and with reference to FIGS. 3-6, another approach to managing interference may be to dynamically adjust the allocation of the licensed bandwidth between allocation regions 202, 204 based on the current needs of users. For example, if MUEs 104 require less data at a given point in time, allocation 200 may allot less bandwidth to allocation region 202 while allotting more bandwidth to allocation region 204 so that SUEs 108 may take advantage of the available bandwidth. Moreover, although the preset allocation approach results in no inter-cell interference between MBS 102 and SeNB 106, this is considered a very conservative approach as MUEs 104 and SUEs 108 might be tolerant to a certain level of interference.

In some embodiments, system 100 may accomplish this dynamic allocation based on an analysis of a plurality of characteristics of system 100, as described in more detail below and with reference to FIGS. 3-6. For example, system 100 may undertake a probability-based analysis in order to determine the fraction of the licensed bandwidth to allocate to allocation regions 202, 204. In some embodiments, SeNB 106 and/or MBS 102 may apply the results of this analysis to select the appropriate radio resource blocks to transmit over the appropriate communication channel(s).

The dynamic allocation of allocation regions 202, 204 may be constrained by a variety of factors, as described in more detail below and with reference to FIGS. 3-6. In some embodiments, one such constraint may be the quality of service ("QOS") requirement(s) of a particular user equipment making a particular data communication request. For example, TABLE 1 below illustrates a number of data communication requests, along with an example QOS requirement for each.

TABLE 1

| QCI | Resource Type | Priority | Packet Delay Budget (ms) | Packet Error Loss Rate | Example Services |
|---|---|---|---|---|---|
| 1 | GBR | 2 | 100 | $10^{-2}$ | Conversational Voice |
| 2 | GBR | 4 | 150 | $10^{-3}$ | Conversational Voice (live streaming) |
| 3 | GBR | 3 | 50 | $10^{-3}$ | Real Time Gaming |
| 4 | GBR | 5 | 300 | $10^{-6}$ | Non-Conversational Video (buffered streaming) |
| 5 | Non-GBR | 1 | 100 | $10^{-6}$ | IMS Signalling |
| 6 | Non-GBR | 6 | 300 | $10^{-6}$ | Video (buffered streaming), TCP-based (e.g., www, e-mail, chat, ftp, etc.) |
| 7 | Non-GBR | 7 | 100 | $10^{-3}$ | Voice, Video (Live Streaming), Interactive Gaming |
| 8 | Non-GBR | 8 | 300 | $10^{-6}$ | Video (buffered streaming), TCP-based (e.g., www, e-mail, chat, ftp, etc.) |
| 9 | Non-GBR | 9 | 300 | $10^{-6}$ | Video (buffered streaming), TCP-based (e.g., www, e-mail, chat, ftp, etc.) |

The examples provided in TABLE 1 illustrate the variety of data resource requests that may be required of an implementation of system 100. For example, system 100 may be required to support a service that requires a guaranteed bit rate ("GBR") and thus low latency but is tolerant of data error (e.g., conversational voice), as well as services that are tolerant of latency while intolerant of error rate (e.g., TCP-based services such as FTP).

These QOS requirements for the various data services act as a constraint on the amount and type of bandwidth that may be allocated to a particular user of system 100. Additionally, the needs of a particular user may change over time. Referring again to FIG. 2, the QOS requirements for a data service may constrain the allocation of the total licensed bandwidth allocated to allocation regions 202, 204. In some embodiments, the allocation may include an analysis of the fraction of total licensed bandwidth that should be allocated to allocation region 204—for communication with SeNB 106. This may include an analysis of what fraction of the total licensed bandwidth should be assigned to a particular SUE 108. FORMULAS 1-2 below illustrate one mechanism for determining this fraction.

$$R_{ld}^{(i)} = \alpha_i B_d \eta_b \eta_c \left[ \alpha_m \log_2\left(1 + \frac{P_s|g_i|^2}{(N_{ol} + P_m|J_i|^2)\eta_s}\right) + \right.$$
$$\left. (1-\alpha_m)\log_2\left(1 + \frac{P_s|g_i|^2}{N_{ol}\eta_s}\right) \right] = \alpha_i B_d \psi_{ld}^{(i)}$$

FORMULA 1

$$\alpha_m = \sum_{j=1}^{M} \alpha_m^{(j)}$$

FORMULA 2

In FORMULAS 1-2 above, the average rate of a given SUE 108 in the licensed band in downlink, as represented by the parameter $R^{(i)}_{ld}$, is determined. This term is calculated from a number of other parameters, including $\alpha_i$, a fraction of bandwidth allocated to SUE 108 from the licensed band in the downlink stage of communication. In FORMULAS 1-2 above, $R_d$ represents the total system bandwidth in the licensed band in the downlink. $R^{(i)}_{ld}$ represents the average rate of the SUE indicated by the index counter i in the licensed band in the downlink.

In reference to FORMULA 1 above, the term between the square brackets may represent the average spectral efficiency. With a probability $\alpha_m$, a certain physical resource block will be used by MBS 102. Thus, if this physical resource block is used by SeNB 106 it may suffer from interference from MBS 102 as in the first term between brackets in the first line of FORMULA 1. There is also a probability $1-\alpha_m$ that a physical resource block is not used by MBS 102 and thus no interference may be considered in the denominator of the second term of FORMULA 1.

As described in more detail below with reference to FIGS. 2-6, these values may be calculated within (or external to, depending on the particular configuration) system 100 and used by the appropriate component to determine the average rate for a given SUE 108.

As described in more detail above and with reference to FIG. 1, interference among SeNBs 106 and MBS 102 may affect the performance of an optimization system. The approach illustrated with FIGS. 1-2 addresses this potential interference. The term $P_s$ represents the transmit power per physical resource block of SeNB 106. The term $P_m$ represents the transmit power per physical resource block of MBS 102. The term $|g_i|^2$ represents the channel power in downlink between SeNB 106 and the particular SUE 108 denoted by the index i. The term $|J_i|^2$ represents the interference power in downlink between MBS 102 and the particular SUE 108 denoted by the index i.

The three parameters $\eta_b$, $\eta_c$, and $\eta_s$ may be used in the design of system 100 for modeling the throughput of a practical system. For example, the first may represent the system bandwidth efficiency, while the second two may be jointly used to model existing efficiencies due to receiver algorithms and supported modulation and coding schemes. As described in more detail above with reference to FIG. 1, it may be necessary or desirable to implement system 100 within existing small cells. The use of these parameters in the design of system 100 may allow the system designer to account for existing design attributes. For example, in simulating a SISO system, a system designer may use the values $\eta_b=0.42$, $\eta_c=1$, and $\eta_s=0.62$.

In addition to the parameters described above, it may also be necessary or desirable in some embodiments to model the noise power per physical resource block in the licensed band. In FORMULAS 1-2, this is represented by the parameter $N_{ol}$. FORMULA 1, therefore, calculates the average downlink rate for a given SUE 108 based on the fraction of bandwidth assigned to that SUE 108 in downlink ($\alpha_i$), the total system bandwidth in the licensed band in downlink ($B_d$), and the average effective spectral efficiency obtained by that SUE 108 ($\psi_{ld}^{(i)}$).

Similar to the approach taken for SUE 108, the average rate for MUE 104 in the licensed band in downlink may be determined. FORMULA 3 below illustrates an example method for determining this rate.

$$R_{md}^{(i)} = \alpha_m B_d \eta_b \eta_c \left[ \alpha_s \log_2\left(1 + \frac{P_m|h_j|^2}{(N_{ol} + P_s|I_j|^2)\eta_s}\right) + \right.$$
$$\left. (1-\alpha_s)\log_2\left(1 + \frac{P_{sm}|h_j|^2}{N_{ol}\eta_s}\right) \right]$$

FORMULA 3

$$\alpha_s = \sum_{i=1}^{S_1} \alpha_i$$

FORMULA 4

In addition to the parameters described above, FORMULAS 3-4 also describe the parameter $S_1$, the number of SUEs 108. They also describe the parameter $|h_j|^2$, which represents the channel power between MBS 102 and a given MUE 104 in downlink. Likewise, $|I_j|^2$ represents the interference power between SeNB 106 and a given MUE 104 in downlink. In some embodiments, the value of $|h_j|^2$ may be reported from MBS 102 from a report sent from MUE 104 to MBS 102 as part of its ordinary operation. An estimation of $|I_j|^2$ may be made from sounding reference signals monitored as part of the ordinary operation of MBS 102. SeNB 106 may use the sounding signals to estimate the path loss in the uplink direction and to estimate the path losses in the downlink. For example, when SeNB 106 overhears sounding signals, it may get estimates of the path loss in the uplink direction from MUEs 104 to SeNB 106. Using the estimates of uplink path losses, SeNB 106 may calculate estimates of the path losses in the downlink. These estimates may be more accurate when using Time Division Duplex operation modes.

In some embodiments, it may be necessary or desirable to maximize the sum rate of all SUEs 108 within system 100 such that the rate of a given MUE 104 is higher than a predefined threshold value (e.g., the parameter $r_m^{(j)}$ of FORMULA 5 below, representing a predefined minimum rate) for all MUEs 104 within the vicinity of SeNB 106. In order to maximize this rate, one approach is to use a linear programming routine to maximize $\alpha_i$ (the fraction of bandwidth in the licensed band in downlink assigned to a given SUE 106) subject to a series of constraints, as illustrated by FORMULA 5 below.

$$\text{Maximize } \{\alpha\} \quad \sum_{i=1}^{S_1} \alpha_i B_d \psi_{ld}^{(i)}$$
$$\text{subject to} \quad R_{md}^{(j)} \geq \bar{r}_m^{(j)}, j = 1, \ldots, M$$
$$\sum_{i=1}^{S_1} \alpha_i \leq \bar{\alpha} - \alpha_m = \overline{\alpha_s}$$
$$0 \leq \alpha_i \leq 1, i = 1, \ldots, S_1$$

FORMULA 5

In this example approach, the first constraint may represent the QOS restraints for MUEs 104 as described in more detail above with reference to FIG. 2. The second constraint may put an upper limit ($\overline{a_s}$) on the sum of bandwidth fractions assigned to all SUEs 108. This upper limit may be a function of a parameter ($\bar{\alpha}$) that may control how much sharing of bandwidth between SeNB 106 and MBS 102 is allowed. In some embodiments, $\bar{\alpha}$ may range from 1 to 1+$\alpha_m$, leading to a range of values for $\bar{\alpha}_s$ of 1−$\alpha_m$ to 1. This may allow the designers of system 100 to control the level of interference of the downlink transmission of SeNB 106 on MUE(s) 104 and the level of interference of the downlink transmission of MBS 102 on SUE(s) 108.

In addition to optimizing intercell interference in the licensed band in downlink, it may also be necessary or desirable in some embodiments to optimize the downlink in both the licensed and unlicensed bands. In the licensed band, resources may be allocated to user equipment by the small cell controller in a centralized, orthogonal and non-overlapped fashion in both frequency and time. In the unlicensed band, however, usage may be more unpredictable and non-controllable. In this case, the user equipment may demand the resource when data communication is required in an on-demand and distributed manner. In the case of the unlicensed band, all users may contend on the communications channel and when a user seizes the channel it takes the entire bandwidth for a certain amount of time before releasing the channel.

In some embodiments, when optimizing the switching and/or aggregation of both licensed and unlicensed band communication, system 100 may take advantage of opportunistic scheduling whenever the resource in the unlicensed band becomes available. Depending on the particular configuration of the unlicensed band system, the throughput through the small cell controller (e.g., SeNB 106) may be dependent on the number of devices contending for access to the wireless medium. Referring again to FIG. 1, system 100 may include a number of SNs 110 (represented by the parameter $S_2$), a number of SUEs 108 (represented by the parameter $S_1$), as well as SeNB 106 itself. Therefore, if all $S_1$ SUEs 108 are having uplink transmissions on the unlicensed band, the total number of devices contending for access to the wireless medium may be represented by the parameter n=$S_1$+$S_2$+1. The parameter n may therefore range from $S_2$+1 to $S_1$+$S_2$+1 depending on the number of SUEs 108 accessing the unlicensed band in the uplink.

FORMULA 6 below illustrates one approach for determining the throughput that a device may be able to achieve using a wireless interface. This formula makes use of the parameters τ and p. The former represents the probability of collision between data requests from a given one of the n nodes contending for the communication channel on the unlicensed band. The latter represents the probability of transmission of a given SUE 108, SN 110, SeNB 104 in a random time slot. In an example model in which all communication channels are homogeneous and the system is saturated, the throughput may be determined as illustrated in FORMULA 6.

$$R_{WIFI} = \frac{\tau(1-\tau)^{n-1} L_i}{(1-\tau)^n \sigma + n_\tau (1-\tau)^{n-1}(T_s - T_c) + (1-(1-\tau)^n)T_c} \quad \text{FORMULA 6}$$

In some embodiments, it may be necessary or desirable to optimize both the licensed and unlicensed band resource allocation to either have switching between the bands when one is congested or aggregation when a higher data rate may be required. In configurations of system 100 wherein SeNB 106 may serve one or more SUEs 108 as well as one or more SNs 110, system 100 may determine how the data transmission rate that may be attained by SeNB 106, over licensed and/or unlicensed bands, may be divided among SUEs 108 in the downlink.

Referring again to FIG. 2, each user equipment may request a variety of data services, with each service having different quality of service ("QOS") requirements. In some embodiments, system 100 may use the QOS requirements of SUEs 108 to determine minimum threshold rates for each SUE 108. Within system 100, this rate may be attained over the licensed and/or unlicensed bands. In some embodiments, this determination may be made by SeNB 106, as described in more detail above with reference to FIG. 1. FORMULA 7 below illustrates an example approach for this joint optimization.

FORMULA 7

$$\text{Maximize } \{\alpha, R_{ud}\} \quad \sum_{i=1}^{S_1} [\alpha_i B_d \psi_{ld}^{(i)} + R_{ud}^{(i)}]$$

$$\text{subject to} \quad \sum_{i=1}^{S_1} R_{ud}^{(i)} \leq R_{AP} - \sum_{k=1}^{S_2} R_{wd}^{(k)}$$

$$\alpha_i B_d \psi_{ld}^{(i)} + R_{ud}^{(i)} \geq \bar{r}_{sd}^{(i)}, i = 1, \ldots, S_1$$

$$R_{md}^{(j)} \geq \bar{r}_m^{(j)}, j = 1, \ldots, M$$

$$\sum_{i=1}^{S_1} \alpha_i \leq \bar{\alpha} - \alpha_m = \bar{\alpha}_s$$

$$0 \leq \alpha_i \leq 1, i = 1, \ldots, S_1$$

$$R_{ud}^{(i)} \geq 0, i = 1, \ldots, S_1$$

The approach illustrated in FORMULA 7 may maximize the sum of downlink throughputs over licensed and unlicensed bands for all SUEs 108. The first constraint illustrated divides the extra capacity that may be attained by SeNB 106 (denoted $R_{AP}$) among SUEs 108. In order not to cause congestion on the unlicensed band, in some embodiments SeNB 106 may serve all active SNs 110 first and determine downlink transmission in the unlicensed band to some or all of the $S_1$ SUEs 108 depending on the extra capacity on the unlicensed band. In other embodiments, SeNB 106 may serve some or all of the $S_1$ SUEs 108 first and determine downlink transmission in the unlicensed band to some or all of the active SNs 110 depending on the extra capacity of the unlicensed band. The second constraint represents the QOS requirements of each SUE 108. The fourth constraint uses the parameter M, which denotes the total number of MUEs 104 in system 100.

In the same or alternative embodiments, it may be more desirable to formulate the optimization problem as a linear programming problem. This may lead to the example approach illustrated in FORMULAS 8-15 below. FORMULA 8 is similar to FORMULA 3, wherein the QOS constraints for MUEs 104 are rewritten in terms of the optimization variable of FORMULA 7.

FORMULA 8

$$R_{md}^{(j)} = \alpha_m^{(j)} B_d \eta_b \eta_c \log_2\left(1 + \frac{P_m |h_j|^2}{N_{ol} \eta_s}\right) - (\alpha_m^{(j)} B_d \eta_b \eta_c$$

$$\left[\log_2\left(1 + \frac{P_m |h_j|^2}{N_{ol} \eta_s}\right) - \log_2\left(1 + \frac{P_m |h_j|^2}{N_{ol} + P_s |I_j|^2} \eta_s\right)\right] \alpha_s$$

-continued $$= C_{m2}^{(j)} - C_{m1}^{(j)} \sum_{i=1}^{S_1} \alpha_i.$$

FORMULA 9 below groups the optimization vectors α and $R_{ud}$ to define a single optimization vector, x. FORMULA 10 then rewrites the coefficient vectors f.

$$x = [\alpha_1 \alpha_2 \ldots \alpha_{S_1} R_{ud}^{(1)} R_{ud}^{(2)} \ldots R_{ud}^{(S_1)}]_{2S_1 \times 1}^T. \quad \text{FORMULA 9}$$

$$f = [B_d \psi_{ld}^{(1)} B_d \psi_{ld}^{(2)} \ldots B_d \psi_{ld}^{(S_1)} 1_{S_1 \times 1}]_{2S_1 \times 1}^T. \quad \text{FORMULA 10}$$

In FORMULA 10, the notation $1_{S_1 \times 1}$ may refer to a column vector of S1 entries that are equal to 1. The desired inequality constraints may be modeled by the matrix A and the vector b, as shown below in FORMULA 11-12. The parameters $r_{ud}$ and γ from FORMULA 12 are defined in FORMULA 13-14.

$$A = \begin{bmatrix} 0_{S_1 \times 1} & 1_{S_1 \times 1} \\ \text{diag}(-B_d \psi_{ld}) & \text{diag}(-1_{S_1 \times 1}) \\ 1_{S_1 \times 1} & 0_{S_1 \times 1} \end{bmatrix}_{(S_1+2) \times 2S_1} \quad \text{FORMULA 11}$$

where the notation diag(y) is used to refer to a diagonal matrix whose diagonal entries are the entries of the vector y.

$$b = [\bar{r}_{ud} - \bar{r}_{sd}^{(1)} - \bar{r}_{sd}^{(2)} \ldots -\bar{r}_{sd}^{(S_1)} \min\{\min_{jy}^{(j)}, \bar{\alpha}_s\}]_{2S_1 \times 1}^T \quad \text{FORMULA 12}$$

$$\bar{r}_{ud} = R_{AP} - \sum_{k=1}^{S_2} R_w^{(k)} \quad \text{FORMULA 13}$$

$$\gamma^{(j)} = \frac{\bar{r}_m^{(j)} - C_{m2}^{(j)}}{C_{m1}^{(j)}} \quad \text{FORMULA 14}$$

The lower and upper bounds of the optimization variable x may defined, respectively, in FORMULAS 15-16 below.

$$l_b = 0_{2S_1 \times 1}, \quad \text{FORMULA 15}$$

$$u_b = [1_{S_1 \times 1} \bar{r}_{ud} 1_{S_1 \times 1}]_{2S_1 \times 1}. \quad \text{FORMULA 16}$$

One advantage of implementing this approach is that the linear programming approach may be solved more efficiently. In system 100 in which the particular configuration may require frequent, dynamic updates, this more efficient solution may be desired.

In addition to optimizing the downlink in the licensed and unlicensed bands as described in more detail above, in some embodiments it may be necessary or desirable to also jointly optimize the downlink and uplink in the unlicensed band. As described in more detail above, the throughput for a given wireless medium may be heavily dependent on the number of devices contending for access to the medium, including SeNB 106. In some implementations of an unlicensed band (e.g., WiFi), the total number of devices contending for access depends not only on devices contending for downlink, but also on devices contending for uplink access.

In some embodiments, optimizing both downlink and uplink activities in the unlicensed band allows system 100 to more efficiently and flexibly control the activities within the unlicensed band while also increasing throughput for both uplink and downlink. In configurations in which the switching and/or aggregation determinations are made centrally (e.g., by SeNB 106), it may allow further efficiencies in processing.

Similar to the issues faced in optimizing downlink in the unlicensed band, an approach presenting an optimization problem for the uplink may be used. As with downlink, SeNB 106 must satisfy the varying QOS requirements for each SUE 108. With uplink, SeNB 106 may be configured to control the number of SUEs accessing the unlicensed band. In some embodiments, this may be performed through the use of a binary indicator. FORMULA 17 below illustrates the number of devices accessing the unlicensed band access point (e.g., SeNB 106). In FORMULA 17, the parameter $u_i$ represents the example binary indicator that indicates whether a given device is connected in uplink to the unlicensed band.

$$n = S_2 + \sum_{i=1}^{S_1} u_i + 1 \quad \text{FORMULA 17}$$

Within system 100, increasing the number of activated uplink transmission may help offload some uplink traffic to the unlicensed band and therefore help satisfy QOS requirements. This may be offset by the fact that the larger the number n of devices accessing the unlicensed band, the lower the throughput for each individual device. This may counteract the ability of system 100 to meet the QOS requirements for other devices. FORMULA 18 illustrates an example approach for maximizing four parameters: (1) the fraction of bandwidth assigned to a given SUE 108 in downlink, α; (2) the throughput of the given SUE 108 in the unlicensed band in downlink, $R_{ud}$; (3) the fraction of bandwidth assigned to the given SUE 108 in uplink, β; and (4) the number of devices to which access to the unlicensed band has been granted.

$$\begin{aligned}
\underset{\{\alpha, R_{ud}, \beta, u\}}{\text{maximize}} \quad & \sum_{i=1}^{S_1} [\alpha_i B_d \psi_{ld}^{(i)} + R_{ud}^{(i)} + \beta_i B_u \psi_{lu}^{(i)} + u_i R_{uu}^{(i)}] \\
\text{subject to} \quad & \sum_{i=1}^{S_1} R_{ud}^{(i)} \leq R_{AP} - \sum_{k=1}^{S_2} R_{wd}^{(k)} \\
& \delta_u \max \leq \sum_{i=1}^{S_1} [u_i - u_i(t-1)] \leq \delta_u \max \\
& \alpha_i B_d \psi_{ld}^{(i)} + R_{ud}^{(i)} \geq \bar{r}_{sd}^{(i)}, i = 1, \ldots, S_1 \\
& R_{md}^{(j)} \geq \bar{r}_m^{(j)}, j = 1, \ldots, M \\
& \beta_i K_u \psi_{lu}^{(i)} + R_{uu}^{(i)} \geq \bar{r}_{su}^{(i)}, i = 1, \ldots, S_1 \\
& R_{MBS} \geq \bar{r}_{MBS} \\
& \sum_{i=1}^{S_1} \beta_i \leq \bar{\beta} - \bar{\beta}_m = \bar{\beta}_s \\
& \sum_{i=1}^{S_1} u_i \leq U_{max} \\
& \sum_{i=1}^{S_1} \alpha_i \leq \bar{\alpha} - \bar{\alpha}_m = \bar{\alpha}_s \\
& 0 \leq \alpha_i \leq 1, i = 1, \ldots, S_1 \\
& 0 \leq \beta_i \leq 1, i = 1, \ldots, S_1 \\
& R_{ud}^{(i)} \geq 0, i = 1, \ldots, S_1 \\
& u_i = 0, 1, i = 1, \ldots, S_1
\end{aligned} \quad \text{FORMULA 18}$$

FORMULA 18 makes use of the following parameters, as described in more detail above: (1) $\alpha_i B_d \psi_{ld}^{(i)}$, which represents the throughput of a given SUE 108 in downlink in the licensed band; (2) $\beta_i B_u \psi^{(i)}_{lu}$, which represents the throughput of a given SUE 108 in uplink in the licensed band; (3) $R^{(i)}_{ud}$, which represents the throughput of a given SUE 108 in downlink in the unlicensed band; (4) $u_i R^{(i)}_{uu}$, which represents the throughput of a given SUE 108 in uplink in the unlicensed band; (5) $R^{(k)}_{wd}$, which represents the throughput of a given SN 110 in downlink; and (6) $R^{(k)}_{wu}$, which represents the throughput of a given SN 110 in uplink.

As described in more detail above, the throughput in the unlicensed band may depend heavily on the number of devices attempting to access the unlicensed band. As described with respect to FORMULA 18, this number (as represented by the parameter u may be variable). FORMULA 19 below illustrates an approach for approximating the variable n by a constant value n'. In the approach illustrated in FORMULA 19, the value $u_i(t-1)$ may be associated with a decision of the unlicensed band uplink transmission at the previous decision instant.

$$n' = S_2 + \sum_{i=1}^{S_1} u_i(t-1) + 1 \qquad \text{FORMULA 19}$$

Using the approximation described above with reference to FORMULA 19, the optimization problem may be reduced to a mixed integer programming problem. Using existing approaches (e.g., Branch-and-Bound, Gomory's Cutting Plane, Lagrangaian Relaxation, Benders Decomposition, etc.), system 100 may efficiently solve the optimization problem.

Figure 3:
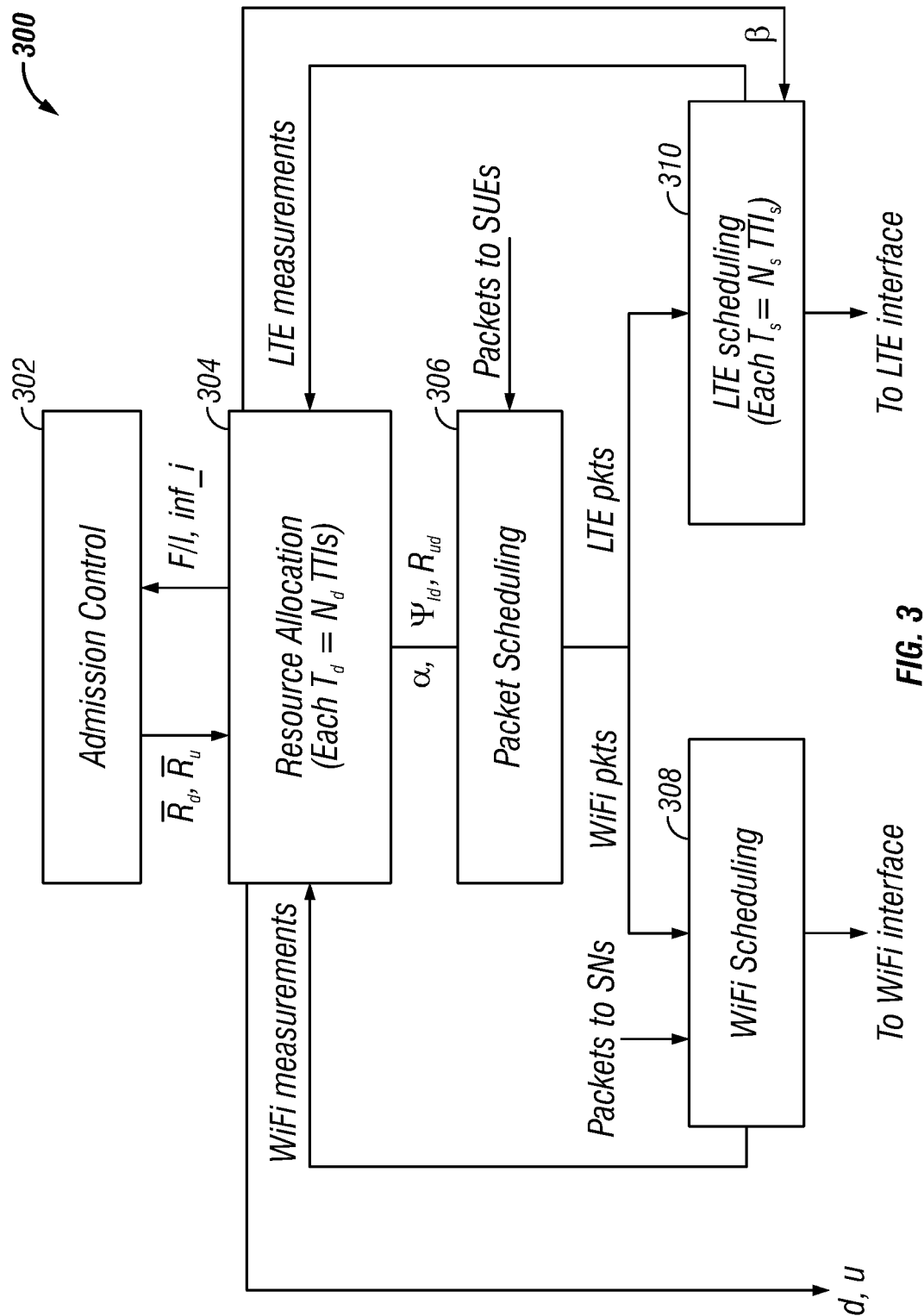
FIG. 3 illustrates a block diagram of a system for switching and/or aggregating communication over the licensed and/or unlicensed bands, in accordance with certain embodiments of the present disclosure.

FIG. 3 illustrates a block diagram of a system 300 for switching and/or aggregating communication over the licensed and/or unlicensed bands, in accordance with certain embodiments of the present disclosure. System 300 includes admission control module 302, resource allocation module 304, packet scheduling module 306, WiFi scheduling module 308, and LTE scheduling module 310.

In some embodiments, the various modules of system 300 may be implemented in hardware, software, firmware, and/or some combination thereof. In the same or alternative embodiments, system 300 may be implemented as part of SeNB 106, as described in more detail above with reference to FIG. 1-2. Alternatively, some or all of the modules of system 300 may be distributed throughout various portions of system 100.

Although the modules of system 300 are illustrated as being discrete modules with discrete tasks, in some configurations of system 300 some or all of the modules may be grouped together in more, fewer, or different modules. For example, admission control module 302 and resource allocation module 304 may be combined into a single module.

In some embodiments, resource allocation module 304 may be configured to determine whether switching and/or aggregation of the licensed and unlicensed bands is currently feasible. For example, the data rate requirements for a given data service request may be too high for the switching system to currently accommodate. Resource allocation module 304 may be further configured to identify which particular service request resulted in a determination of unfeasibility (e.g., by identifying the particular SUE 108 issuing the service request). In some embodiments, admission control module 302 may be configured to deny admission of certain SUEs 108. In the same or alternative embodiments, admission control module 302 may be configured to alter a QOS requirement of certain SUEs 108 that resulted in the infeasibility determination.

In some embodiments, system 300 may also include resource allocation module 304. As described in more detail above with reference to FIGS. 1-2, optimization of communication at a small node for both licensed and unlicensed bands may include finding a feasible solution given the downlink and uplink rate constraints (e.g., the two inputs denoted in FIG. 3), as described in more detail above with reference to FORMULA 18. Resource allocation module 304 may be configured to indicate to admission control module 302 whether a feasible solution is available. In some embodiments, it may do so by communicating a feasible/infeasible signal (denoted as "F/I" in FIG. 3). For example, a value of zero may indicate that there is no feasible solution, while a value of one may indicate that there is a feasible solution. Resource allocation module 304 may be further configured to provide admission control module 302 with the identity of the devices for which the QOS requirements can not be met (denoted as "inf_i" in FIG. 3). Admission control module 302 may then use this information to decrease the corresponding QOS requirements or deny the admission of that SUE 108.

In some embodiments, resource allocation module 304 may run its optimization routines periodically. For example, the time period between runs ($T_d$) may be calculated by $N_d$ Transmission Time Intervals ("TTI"), where $N_d$ may be a design parameter indicating how much time (in units of subframes, i.e., TTIs) may be required for the operation of resource allocation module 304. As described in more detail above with reference to FIG. 1-2, the main outputs of the optimization routines may be values indicative of the bandwidth allocation and available rates. In some embodiments, they may also include the number of devices for which to grant access to the small cell access point (e.g., SeNB 106), as well as identifiers of spectral efficiency. For example, resource allocation module 304 may provide the vectors $\alpha$ and $\beta$, which may represent the fraction of licensed bandwidth in downlink and uplink, respectively, to be allocated to SUE 108. Resource allocation module 304 may also communicate the vector $\psi_{ld}$, which may be associated with the spectral efficiency of each SUE 108. Resource allocation module 304 may also communicate the vector $R_{ud}$, which may represent the downlink rate on the unlicensed band for each SUE 108.

In some embodiments, system 300 may also include packet scheduling module 306. Packet scheduling module 306 may be configured to determine how much data to send over which communication band. For example, packet scheduling module 306 may use a bucketing approach for accumulating data over a time $T_d$, distributing the data segments into the appropriate licensed or unlicensed bucket, and then sending the buckets to the appropriate communication band. In other configurations, other scheduling methods may be implemented, such as a round-robin, first-come-first-served system, etc.

System 300 may also include WiFi scheduling module 308. In some embodiments, WiFi scheduling module 308 may be configured to take data packets received from packet scheduling module 306 and deliver them to the WiFi interface. In some configurations, WiFi scheduling module 308 may also take certain measurements of the current state of the WiFi interface for communication back to resource allocation module 304, as described in more detail above with reference to FIGS. 1-2.

System 300 may also include a licensed band scheduling module such as LTE scheduling module 310. In some embodiments, LTE scheduling module 310 may be configured to take data packets received from packet scheduling module 306 and deliver them to the LTE interface. In some configurations, LTE scheduling module 310 may also take certain measurements of the current state of the LTE interface for communication back to resource allocation module 304, as described in more detail above with reference to FIGS. 1-2.

In order to support the switching and/or aggregation operations described in more detail above with reference to FIGS. 1-3, system 100 may need to implement some signaling between user equipment and the small cell controller.

Figure 4:
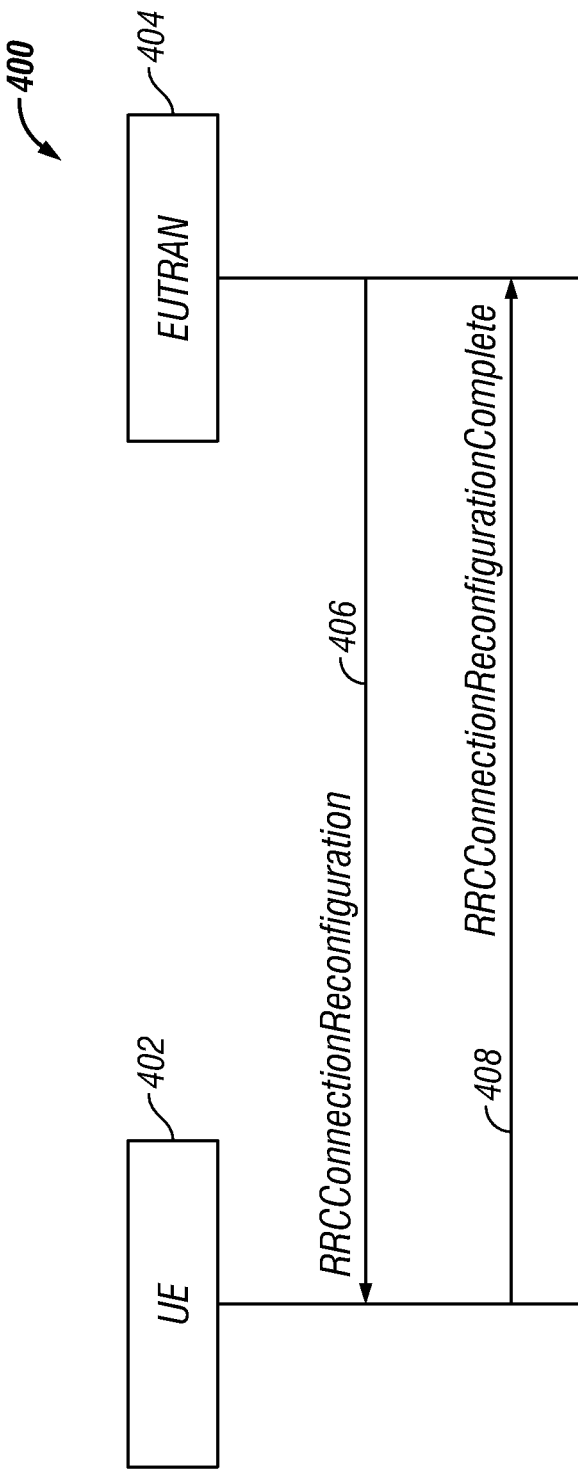
FIG. 4 illustrates an example signaling diagram for supporting the switching and/or aggregation operations, in accordance with certain embodiments of the present disclosure.

FIG. 4 illustrates an example signaling diagram 400 for supporting the switching and/or aggregation operations, in accordance with certain embodiments of the present disclosure. In some embodiments, signaling diagram 400 includes user equipment ("UE") 402. UE 402 may be any electronic device configured to communicate over the licensed band. For example, UE 402 may correspond to SUE 108 as illustrated above with reference to FIG. 1.

Signalling diagram 400 may also include a radio access network such as Evolved UMTS Terrestrial Radio Access Network ("EUTRAN") 304. EUTRAN 304 is the radio access network underlying the 3GPP standard. Other configurations of systems 100, 300 may implement different radio access network(s) without departing from the scope of the present disclosure.

In example signaling diagram 400, UE 402 and EUTRAN 404 require coordination in order to implement the optimization routines described in more detail above with reference to FIGS. 1-3. One example approach is to use the RRCConnectionReconfiguration message 406 and RRCConnectionReconfigurationComplete message 408 specified in the 3GPP standard. By appending two additional bits, di and ui, to the RRCConnectionReconfiguration message, UE 402 and EUTRAN 404 may coordinate activities. TABLE 2 below illustrates a set of example values for these two additional bits, in addition to an example interpretation for those values. As would be apparent to one of ordinary skill in the art, the precise approach for signaling between user equipment and radio access network base station may vary widely depending on the specific implementation without departing from the scope of the present disclosure.

TABLE 2

| $d_i$ | $u_i$ | Interpretation |
|---|---|---|
| 0 | 0 | Disable WiFi interface |
| 0 | 1 | Enable WiFi interface for uplink transmission only |
| 1 | 0 | Enable WiFi interface for downlink reception only |
| 1 | 1 | Enable WiFi interface for both uplink transmission and download reception |

Because the coordination operations may be concluded solely between the user equipment and the radio access network base station, involvement by the cellular provider's core network may be unnecessary and therefore reduce overhead processing time.

In addition to signaling between UE 402 and EUTRAN 404, system 100 may in some embodiments also be configured to allow signaling between MBS 102 and the small cell controller, e.g., SeNB 106. As described in more detail above, with reference to FIGS. 1-3, and below with reference to FIGS. 5-6, it may be necessary or desirable to provide SeNB 106 with certain values in order to more effectively control the intercell interference. Three of those values are $\bar{r}_m^{(j)}$, $\alpha_m^{(j)}$, and $\bar{r}_{MBS}$. The first value, $\bar{r}_m^{(j)}$, may represent a minimum rate requirement of a given MUE 104 in downlink of the licensed band. The second, $\alpha_m^{(j)}$, may represent a fraction of the licensed bandwidth assigned to the given MUE 104 in downlink. Finally, $\bar{r}_{MBS}$ may represent a minimum rate of MBS 102 in uplink of the licensed band. SeNB 106 may also be configured to make use of additional values. For example, SeNB 106 may be configured to incorporate values representative of path losses between MUEs 104 and MBS 102.

In some embodiments, the small cell controller (e.g., SeNB 106) may be configured to receive certain of these values from MBS 102. For example, MBS 102 may be configured to signal the rate requirement $\bar{r}_m^{(j)}$. In some configurations, this signaling may be done by signaling the rate requirement after quantization in 12 bits starting with 10 kpbs with a resolution of 20 kpbs. This may allow system 100 to achieve a maximum value of up to 81.91 Mpbs for the minimum rate requirements. Depending on the particular configuration of system 100, these values may vary to achieve the design characteristics of the particular configuration. The rate requirement value may be communicated for each MUE 104 in the vicinity of SeNB 106. This number of MUEs 104 (denoted as "M" in the rate requirement notation) may be determined by MBS 102. For example, MBS 102 may determine the number of MUEs 104 reporting low Channel Quality Indicator ("CQI") values. In the same or alternative configurations, the CQI values may be considered in combination with other values indicative of suffering from interference in the vicinity of SeNB 106. For example, M may have a range of zero to thirty-one, thereby requiring 5 bits for communicating the value.

In addition to the rate requirement, SeNB 106 may also make use of the fraction of bandwidth $\alpha_m^{(j)}$ assigned to a given MUE 104. This value may be reported to SeNB 106 from MBS 102. For example, each MUE 104 may use four bits for each of the M MUEs 104 to communicate the bandwidth fraction. This may result in a resolution of 0.0625 for $\alpha_m^{(j)}$. In other configurations, other values may be used for the signaling in order to achieve the design characteristics of the particular configuration.

In some embodiments, SeNB 106 may also make use of minimum rate value $\bar{r}_{MBS}$. In other embodiments, SeNB 106 may ignore this value or set it zero or a very small value such that the corresponding constraint within the relevant optimization problem may be satisfied. For example, in configurations in which SUEs 108 already have small transmission powers in uplink due to the proximity of SUEs 108 to SeNB 106, the interference caused by SUEs 108 in the uplink on MBS 102 may be negligible. However, in other configurations, the design characteristics may be such so as to consider the minimum rate value. For example, $\bar{r}_{MBS}$ may be communicated from MBS 102 to SeNB 106 in 12 bits starting with 100 kpbs with a resolution of 25 kpbs to achieve a maximum value of 102.45 Mpbs. Other configurations may use different values for the signaling in order to achieve the design characteristics of the particular configuration.

In the same or alternative embodiments, SeNB 106 may also make use of path losses between MUEs 104 and MBS 102. For example, MBS 102 may estimate the path loss by sending the uplink CQI to SeNB 106, as described in more detail above and with reference to FIGS. 2-3. In some configurations, the CQI level may be represented in 4 bits per MUE 108. Other configurations may use different values for the signaling in order to achieve the design characteristics of the particular configuration. SeNB 106 may then be able to estimate the path losses from the CQI information.

In embodiments in which multiple SeNBs 106 are communicatively coupled, more, fewer, or different values may be used to aid in the optimization problem. In such embodiments, SeNBs 106 may be configured to signal via some other communication channel. For example, SeNBs 106 may be configured to communicate over a dedicated channel and/or through the backhaul of the cellular service provider.

Figure 5:
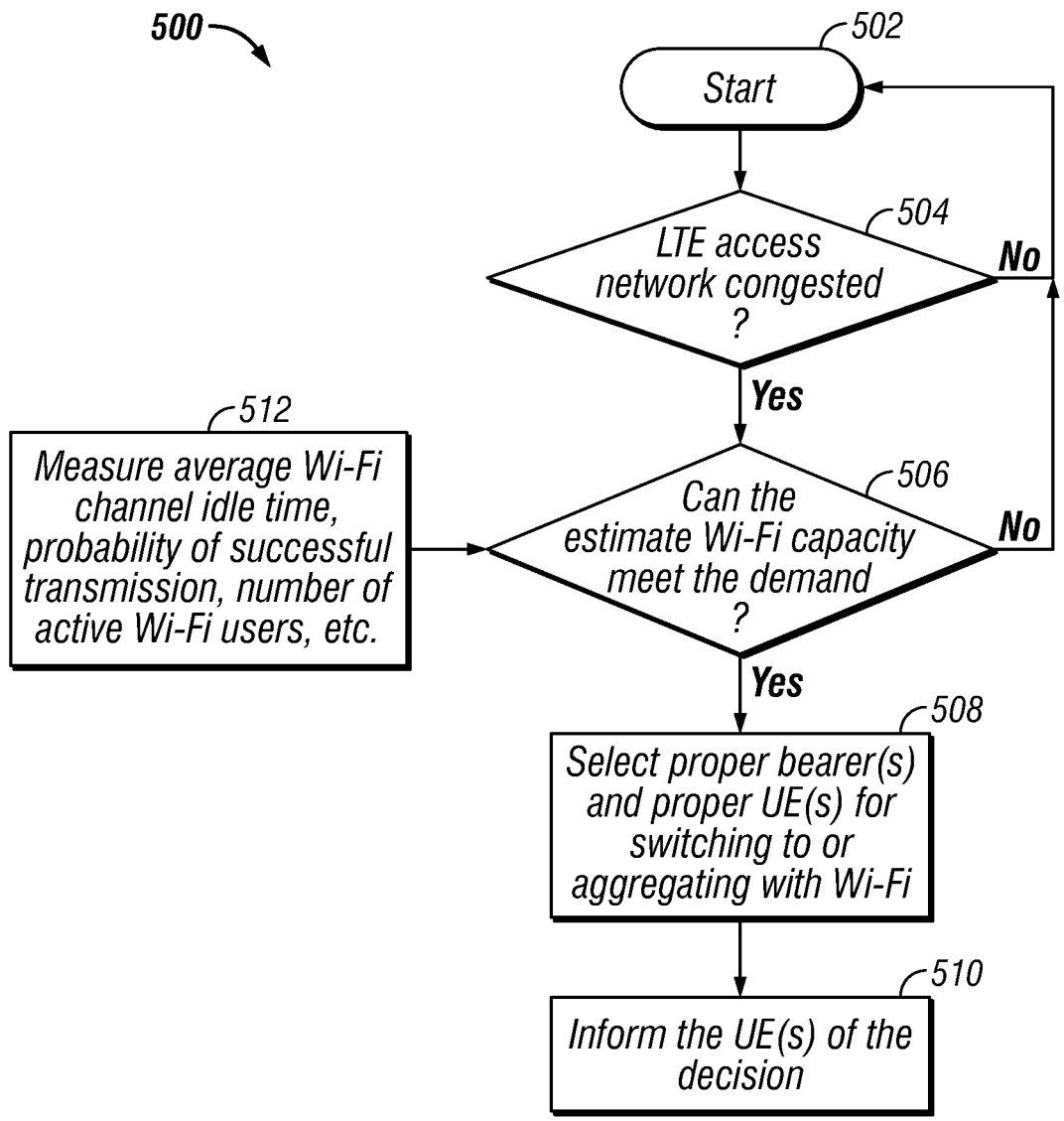
FIG. 5 is a flowchart of an example method for determining whether a user equipment should have traffic switched to an unlicensed communication band, in accordance with certain embodiments of the present disclosure.

FIG. 5 is a flowchart of an example method 500 for determining whether a user equipment should have traffic switched to an unlicensed communication band, in accordance with certain embodiments of the present disclosure. In some embodiments, method 500 may include steps 502-12. Although illustrated as discrete steps, various steps may be divided into additional steps, combined into fewer steps, or eliminated, depending on the desired implementation.

In some embodiments, method 500 may begin at step 502, at which the optimization routine may begin. As described in more detail above with reference to FIGS. 1-4, this may be instanced by the coming into range of a small cell control by a user, or (as described in more detail above with reference to FIG. 3) after the passage of a predetermined period of time.

After beginning the process, method 500 may proceed to step 504. At step 504, method 500 may determine whether or not the licensed band (e.g., the LTE network) is sufficiently congested as to warrant an attempted optimization. If it is not sufficiently congested, method 500 may return to step 502 to wait for another event (e.g., the passage of the predetermined time period). If the network is sufficiently congested, method 500 may proceed to step 506.

At step 506, method 500 may determine whether the unlicensed band (e.g., the WiFi band) has sufficient capacity to meet the demand, as described in more detail above with reference to FIGS. 1-4. In some embodiments, certain data values may be useful in the determination made at step 506. For instance, average channel idle time, the number of active users, etc., may be used to make the determination. At step 512, this information may be passed to step 506 for use in the determination, as described in more detail above with reference to FIGS. 1-4. If the unlicensed band can meet the demand, method 500 may proceed to step 508.

At step 508, method 500 may select one or more appropriate bearer(s) and proper UE(s) for switching to and/or aggregating with the unlicensed band, as described in more detail above with reference to FIGS. 1-4. After selecting the bearers and UEs, method 500 may proceed to step 510, where method 500 may inform the UE(s) of the decision, as described in more detail above with reference to FIG. 4.

In some embodiments, the steps of method 500 may be performed by software, hardware, firmware, and/or some combination thereof. For example, the steps of method 500 may be performed by SeNB 106 of system 100. In other embodiments, different steps may be performed by different components. For example, step 512—measuring the data values for use in the optimization routines—may be performed by various components of system 100.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. As an illustrative example, method 500 may further include receiving a response from the UE indicating whether the reconfiguration was complete. As an additional illustrative example, method 500 may further include indicating which UEs were responsible for the inability to meet the requested capacity.

Figure 6:
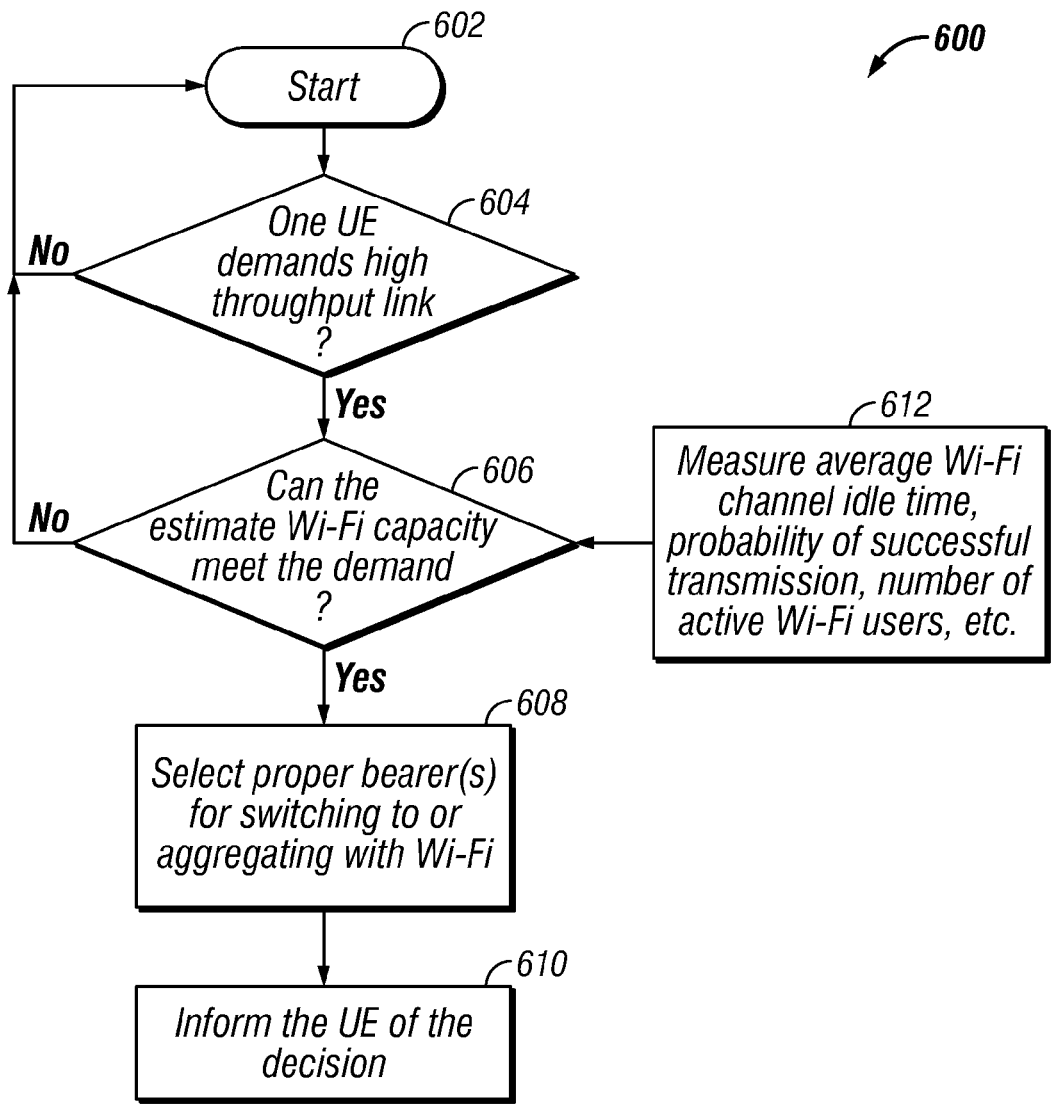
FIG. 6 is a flowchart of an example method for determining whether a user equipment should have traffic aggregated with traffic in an unlicensed communication band, in accordance with certain embodiments of the present disclosure.

FIG. 6 is a flowchart of an example method 600 for determining whether a user equipment should have traffic aggregated with traffic in an unlicensed communication band, in accordance with certain embodiments of the present disclosure. In some embodiments, method 600 may include steps 602-12. Although illustrated as discrete steps, various steps may be divided into additional steps, combined into fewer steps, or eliminated, depending on the desired implementation.

In some embodiments, method 600 may begin at step 602, at which the optimization routine may begin. As described in more detail above with reference to FIGS. 1-4, this may be instanced by the coming into range of a small cell control by a user, or (as described in more detail above with reference to FIG. 3) after the passage of a predetermined period of time.

After beginning the process, method 600 may proceed to step 604. At step 604, method 600 may determine whether or not a UE has demanded a high throughput link. If not, method 600 may return to step 602 to wait for another event (e.g., the passage of the predetermined time period). If so, method 600 may proceed to step 606.

At step 606, method 600 may determine whether the unlicensed band (e.g., the WiFi band) has sufficient capacity to meet the demand, as described in more detail above with reference to FIGS. 1-4. In some embodiments, certain data values may be useful in the determination made at step 606. For instance, average channel idle time, the number of active users, etc., may be used to make the determination. At step 612, this information may be passed to step 606 for use in the determination, as described in more detail above with reference to FIGS. 1-4. If the unlicensed band can meet the demand, method 600 may proceed to step 608.

At step 608, method 600 may select one or more appropriate bearer(s) and proper UE(s) for switching to and/or aggregating with the unlicensed band, as described in more detail above with reference to FIGS. 1-4. After selecting the bearers and UEs, method 600 may proceed to step 610, where method 600 may inform the UE(s) of the decision, as described in more detail above with reference to FIG. 4.

In some embodiments, the steps of method 600 may be performed by software, hardware, firmware, and/or some combination thereof. For example, the steps of method 600 may be performed by SeNB 106 of system 100. In other embodiments, different steps may be performed by different components. For example, step 612—measuring the data values for use in the optimization routines—may be performed by various components of system 100.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. As an illustrative example, method 600 may further include receiving a response from the UE indicating whether the reconfiguration was complete. As an additional illustrative example, method 600 may further include indicating which UEs were responsible for the inability to meet the requested capacity.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the invention.

What is claimed is:

1. A small cell controller for aggregating wireless data transmitted to and from user equipment (UE) between a cellular network and a noncellular network, the small cell controller comprising:
    a cellular interface to communicate data with the cellular network and receive a plurality of values associated with the cellular network, wherein the plurality of values are based on a rate requirement;
    a noncellular interface to communicate data with the noncellular network; and
    an analyzer configured to:
        determine whether a portion of the wireless data may be transferred from the cellular network to the noncellular network based at least on the plurality of values associated with the cellular network;
        determine a first portion of the noncellular network to be allocated to the portion of the wireless data when the portion of the wireless data may be transferred;
        determine whether to transfer a portion of the wireless data from the cellular network to the noncellular network based at least in part on a joint optimization of downlink traffic on a second portion of the noncellular network, uplink traffic on a second portion of the noncellular network, downlink traffic on a third portion of the noncellular network, uplink traffic on a first portion of the cellular network, downlink traffic on a second portion of the cellular network, and downlink traffic on a portion of the cellular network;
        aggregating the portion of the wireless data from the cellular network with data of the noncellular network; and
        coordinate activities between the UE and the small cell controller without communicating with a core network of the cellular network.

2. The small cell controller of claim 1, wherein the analyzer is configured to determine whether to transfer a portion of the wireless data from the cellular network to the noncellular network based at least in part on an analysis of intercell interference.

3. The small cell controller of claim 1, wherein the joint optimization is based at least on a linear programming approach.

4. The small cell controller of claim 1, wherein the joint optimization is based at least on a mixed integer programming approach.

5. The small cell controller of claim 1, wherein the cellular interface is configured to provide a signal to user equipment, wherein the signal is configured to notify the user equipment of data associated with the first portion of the noncellular network.

6. The small cell controller of claim 5, wherein the data associated with the first portion of the noncellular network comprises data to notify the user equipment to enable a user equipment noncellular interface.

7. The small cell controller of claim 1, wherein the noncellular interface is configured to determine a number of devices allowed access to the noncellular network.

8. The small cell controller of claim 1, wherein the coordinating comprises appending bits to an RRCConnectionReconfiguration message that indicate whether to enable the noncellular interface and whether to enable uplink transmission, downlink reception or both.

9. A method of aggregating a wireless data transmitted to and from user equipment (UE) between a cellular network and a noncellular network, the method comprising:
    receiving a plurality of values associated with the cellular network, wherein the plurality of values are based on a rate requirement;
    determining whether to transfer a portion of the wireless data from the cellular network to the noncellular network based at least on the plurality of values associated with the cellular network;
    determining a first portion of the noncellular network to be allocated to the portion of the wireless data when the portion of the wireless data may be transferred;
    determining whether to transfer a portion of the wireless data from the cellular network to the noncellular network based at least in part on a joint optimization of downlink traffic on a second portion of the noncellular network, uplink traffic on a second portion of the noncellular network, downlink traffic on a third portion of the noncellular network, uplink traffic on a first portion of the cellular network, and downlink traffic on a second portion of the cellular network, and downlink traffic on a portion of the cellular network;
    aggregating the portion of the wireless data from the cellular network with data of the noncellular network; and
    coordinating activities between the UE and a small cell controller without communicating with a core network of the cellular network.

10. The method of claim 9, wherein the determining to transfer a portion of the wireless data from the cellular network to the noncellular network is based at least in part on an analysis of intercell interference.

11. The method of claim 9, wherein the joint modification is based at least on a linear programming approach.

12. The method of claim 9, wherein the joint modification is based at least on a mixed integer programming approach.

13. The method of claim 9, further comprising providing a signal to user equipment, wherein the signal is configured to notify the user equipment of data associated with the first portion of the noncellular network.

14. The method of claim 13, wherein the data associated with the first portion of the noncellular network comprises data to notify the user equipment to enable a user equipment noncellular interface.

15. The method of claim 9, further comprising determining a number of devices allowed access to the noncellular network.

16. The method of claim 9, wherein the coordinating comprises appending bits to an RRCConnectionReconfiguration message that indicate whether to enable the noncellular interface and whether to enable uplink transmission, downlink reception or both.

17. A small cell controller for aggregating wireless data transmitted to and from user equipment (UE) between a cellular network and a noncellular network, the small cell controller comprising:
    a cellular interface to communicate data with the cellular network and receive a plurality of values associated with the cellular network, wherein the plurality of values are based on a rate requirement, the cellular interface configured to provide a signal to user equipment, the signal configured to notify the user equipment of data associated with the first portion of the noncellular network, the data associated with the first portion of the noncellular network comprises data to notify the user equipment to enable a user equipment noncellular interface;

a noncellular interface to communicate data with the noncellular network; and an analyzer configured to:
  determine whether a portion of the wireless data may be transferred from the cellular network to the noncellular network based at least on the plurality of values associated with the cellular network;
  determine a first portion of the noncellular network to be allocated to the portion of the wireless data when the portion of the wireless data may be transferred;
  determine whether to transfer a portion of the wireless data from the cellular network to the noncellular network based at least in part on a joint optimization of downlink traffic on a second portion of the noncellular network, uplink traffic on a second portion of the noncellular network, downlink traffic on a portion of the cellular network, downlink traffic on a third portion of the noncellular network, uplink traffic on a first portion of the cellular network, and downlink traffic on a second portion of the cellular network;
  aggregating the portion of the wireless data from the cellular network with data of the noncellular network; and
  coordinate activities between the UE and the small cell controller without communicating with a core network of the cellular network, the data to notify the user equipment comprising data to disable the noncellular interface, enable the noncellular interface for uplink transmission only, enable the noncellular interface for downlink reception only, and enable the noncellular interface for both uplink transmission and download reception.

* * * * *